United States Patent Office 3,573,251
Patented Mar. 30, 1971

3,573,251
STABILIZED POLYURETHANE ELASTOMERS
Ignazio Salvatore Megna, Somerville, and Frank Aloysius Vincent Sullivan, Westfield, N.J., assignors to American Cyanamid Company, Stamford, Conn.
No Drawing. Filed Mar. 11, 1968, Ser. No. 711,841
Int. Cl. C08g 51/58
U.S. Cl. 260—45.8    5 Claims

ABSTRACT OF THE DISCLOSURE

Polyurethane elastomers are made resistant to discoloration on exposure to atmospheric fumes as well as ultraviolet radiation by the incorporation of a substituted phenol and an organic phosphite. Typical substituted phenols have the formulas:

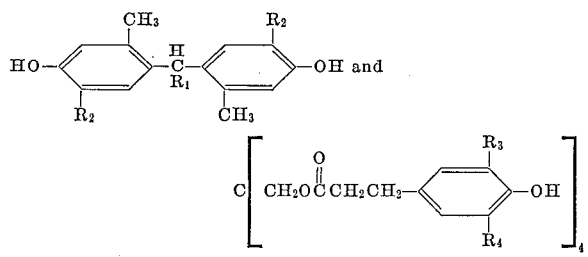

where $R_1$ is hydrogen or alkyl ($C_1$–$C_8$); $R_2$ is alkyl ($C_4$–$C_8$); and $R_3$ and $R_4$ are alkyl ($C_1$–$C_8$). Typical organic phosphites have the formulas:

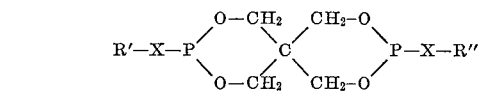

and

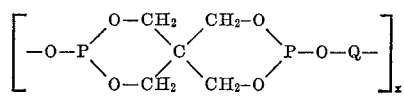

where R' and R'' are alkyl ($C_6$–$C_{18}$); X is oxygen or sulfur; Q is a hydrogenated bisphenol A residue; and $x$ is sufficient to provide a molecular weight of at least 1,000.

This invention relates to color-stabilized polyurethane elastomers. More particularly, it relates to a method for increasing the resistance of polyurethane elastomers to discoloration caused by atmospheric fumes as well as by ultraviolet light, and to the polyurethane elastomers thus obtained.

It is well known that polyurethane elastomers, such as spandex fibers, are subject to yellowing when exposed to oxides of nitrogen and other fumes. Also, yellowing takes place on exposure to atmospheric conditions, particularly where ultraviolet radiation is present.

Among the various additives suggested for stabilizing polyurethanes may be mentioned the substituted phenols described in U.S. Pats. 2,915,496 and 3,085,991 and the pentaerythritol phosphite esters of U.S. Pat. 3,053,878. While perhaps providing acceptable stabilization to polyurethanes for some purposes, it has been observed that with respect to polyurethane elastomers neither member of these two classes of compounds alone provides a consistently high level of resistance to discoloration, particularly that which is occasioned by exposure to an environment providing both ultraviolet radiation and fumes.

For example, as illustrated hereinafter, it has been noted that polyurethane elastomers become extremely discolored on exposure to ultraviolet radiation but are not unduly discolored when exposed in a standard test to fumes only. When a substituted phenol is added to the elastomers, discoloration by ultraviolet radiation is substantially and acceptably reduced. However, the elastomers become badly discolored when exposed to fumes. When the phosphite is employed alone the elastomer does not become unacceptably discolored but the discoloration upon exposure to ultraviolet radiation is even worse than the result when the elastomer, containing the substituted phenol stabilizer only, was exposed to fumes.

An object of the present invention, therefore, is to provide polyurethane elastomers effectively stabilized against discoloration induced by ultraviolet radiation as well as by atmospheric fumes, these being the conditions of prevalent use of polyurethane elastomers, without seriously detracting from other properties of the elastomers.

Accordingly, it has been discovered that this object is achieved by incorporating into polyurethane elastomers a combination of certain substituted phenols and organic phosphites.

The substituted phenols are known and form two classes. The first class comprises alkylidene bis(polyalkyl phenols), particularly wherein the alkylidene group contains 1 to 9 carbon atoms inclusive and at least one of the alkyl substituents on each phenyl group contains 4 to 8 carbon atoms inclusive and a second alkyl substituent on each phenyl group containing 1 to 3 carbon atoms inclusive.

Particularly preferred phenols of this class are those described in U.S. Pat. 2,822,404, such as 4,4'-butylidene bis(6-tert-butyl-m-cresol), of the formula:

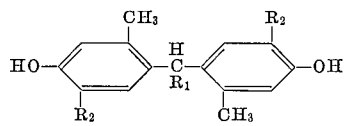

which also may be written as:

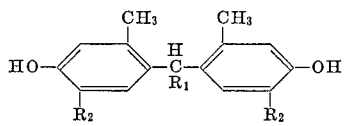

wherein $R_1$ is hydrogen or methyl through octyl and $R_2$ is butyl through octyl.

The second class of substituted phenols are those described in U.S. Pat. 3,285,855:

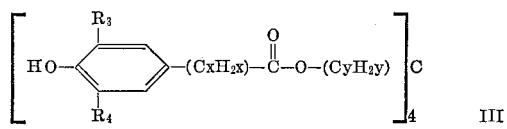

where $R_3$ and $R_4$ are lower alkyl, i.e., contain 1 through 8 carbon atoms; and $x$ and $y$ independently are each 1 through 6. Preferred are those compounds wherein $R_3$ and $R_4$ each are tertiary butyl, $x$ is 2, and $y$ is 1.

The organic phosphites are known aliphatic tertiary phosphite esters of monohydric or polyhydric alcohols, including mixtures of alcohols, such as octanol, decanol, dodecanol, hexamethylene glycol, decamethylene glycol, pentaerythritol, 4,4'-isopropylidenedicyclohexanol, and the like.

Two classes of such phosphites are preferred:

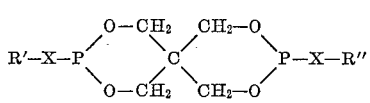

where R' and R'' are alkyl ($C_6$–$C_{18}$) and X is oxygen or sulfur. Phosphites of Formula IV are disclosed in U.S. Pats. 3,039,993 and 2,961,454. The phosphites of the latter patent are preferred, particularly where X is oxygen.

The second class comprises known phosphite esters having the recurring structural unit:

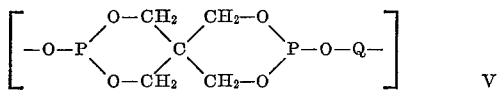

where Q is the alkylene residue of a dihydric alcohol, the arylene residue of a dihydric phenol, and the halo substituted derivative thereof. Particularly preferred are polymers of this structure wherein Q is a hydrogenated bisphenol A residue and the molecular weight is at least 1,000, e.g., 2,500 to 30,000. Phosphite esters of Formula V are disclosed in U.S. Patent 3,053,878.

The polyurethane elastomers color-stabilized by addition of the substituted phenols and organic phosphites are well known in the art and in commerce and are too numerous to describe in extensive detail. In general terms, they are prepared by (1) reacting an organic diisocyanate with a polyol such as a polyalkylene ether glycol or a hydroxy-terminated polyester, to form an isocyanate-terminated polyurethane prepolymer, and (2) reacting the prepolymer with suitable difunctional amines and hydroxy-containing compounds.

In preparing the isocyanate-terminated prepolymer, a molar excess of the organic diisocyanate is mixed with the polyalkylene ether glycol or hydroxy-terminated polyester or combination of the two, and the mixture is heated at about 50° C. to 120° C. until a polyurethane prepolymer is formed having terminal isocyanate groups.

A wide range of organic diisocyanates of the aromatic and aliphatic classes can be used including tolylene-2,4-diisocyanate, tolylene-2,6-diisocyanate, phenylene diisocyanate, biphenylene-4,4'-diisocyanate, methylenebis(4-phenyl isocyanate), naphthalene-1,5-diisocyanate, tetramethylene-1,4-diisocyanate, hexamethylene - 1,6 - diisocyanate, and the like. The preferred diisocyanates have the isocyanate groups attached to aromatic rings.

Suitable polyalkylene ether glycols include those of molecular weight between 300 and 5,000, preferably between 500 and 3,000. Useful glycols of this type include polyethylene ether glycol, polypropylene ether glycol, polytetramethylene ether glycol, polyhexamethylene ether glycol, polyoctamethylene ether glycol, polydecamethylene ether glycol, and mixtures thereof.

The hydroxy-terminated polyesters can be formed by reacting dibasic acids with glycols. Useful dibasic acids include adipic acid, succinic acid, sebacic acid, terephthalic acid, their alkyl and halogen derivatives, and the like. Useful glycols include propylene glycol and the like. Suitable polyesters have molecular weights in the same ranges as for the polyalkylene ether glycols. Isocyanate-extended polyester glycols may also be used.

Representative diamines which may be used for chain extending the prepolymer include ethylenediamine, hydrazine, 1,3 - propanediamine, 1,4 - butanediamine, $\alpha,\alpha'$ - diamino-p-xylene, piperazine, and the like. In one preferred procedure at least 5% of 1,4-bis(3-aminopropyl)piperazine is present in the mixture of chain extenders.

The polyurethane elastomer may be molded, extruded, cast, spun into a spandex fiber, or given any other form conventional in the art, including cross-linking by heat or use of cross-linking agents. The substituted phenol and organic phosphite may be added at any convenient point in the manufacture or processing of the elastomer. Preferably, the two stabilizers are added to the polymer solution resulting from chain extension of a prepolymer. In the case of spandex fiber, the stabilizers may be added to the polyurethane polymer solution prior to or simultaneously with spinning of the fiber, or the stabilizers may be applied to the spun fiber, for example, after first incorporating the stabilizers in a conventional fiber lubricant or finish.

Effective amounts of the organic phosphites are in the range of about 0.2% to 3.0%, preferably 0.5% to 2.0% based on the weight of the polyurethane elastomer. On the same basis, effective amounts of the substituted phenols are in the range of about 0.5 to 2.0%, preferably 1.0% to 1.5%. Higher concentrations may be employed but tend to be uneconomical.

Besides the substituted phenol and organic phosphite stabilizers, other additives may be employed, including pigments, ultraviolet absorbers, and many others known in the art.

Obviously, the substituted phenols and organic phosphites may be employed as mixtures of two or more of each class without departing from the spirit of the invention.

The following examples will serve as further illustration of the invention and are not intended to limit the invention except as set forth in the appended claims.

The stabilizers used in the examples are identified as follows:

Stabilizer A: Molecular weight 2,500 to 3,000.

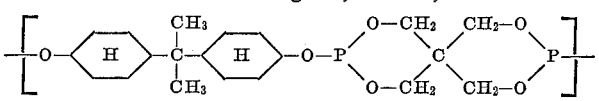

Stabilizer B:

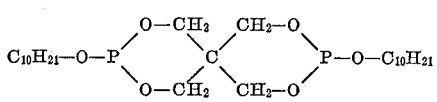

H indicates the ring is completely hydrogenated.

The antioxidants used in the examples are identified as follows:

Antioxidant A:

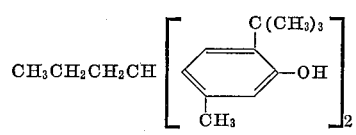

4,4'-butylidenebis (6-tertiary-butyl-m-cresol).
Antioxidant B (Irganox 1010):

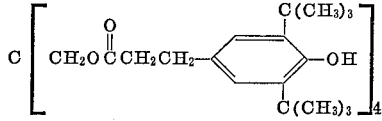

Tests for discoloration by atmospheric fumes were carried out according to AATCC Standard Test Method 23–1962, as described on page B–81 of the Technical Manual of the American Association of Textile Chemists and Colorists (1966). Tests for discoloration by ultraviolet radiation were carried out according to AATCC Standard Test Method 16A–1964 as described on page B–72 of the above manual. The standards for evaluating the discoloration caused by fumes or ultraviolet light in Examples 1 and 2 were a set of five fabrics ranging in color from essentially colorless to a deep shade of yellow and arbitrarily designated 5.0 for the colorless and 1.0 for the deepest yellow with 4.0, 3.0 and 2.0 for the intermediate intensities of yellow. These colors conform closely to standards customarily used by the trade. Visual comparisons can very easily distinguish 0.5 difference in color, i.e., the difference between 2.5 and 3.0 is easily detected.

The polyurethane elastomer employed in the examples is prepared as follows:

(A) PREPARATION OF PREPOLYMER

A mixture of 2,400 g. (1.2 moles) of hydroxy-terminated polyneopentyl adipate (M.W. 2,000), 750 g. (0.3 mole) of polypropylene ether glycol (M.W. 1,000) and 750 g. (3.0 moles) of methylenebis(4-phenylisocyanate) is heated at 95–100° C. for 45 minutes. The resulting isocyanate-terminated prepolymer is cooled to about 80° C., and 750 ml. of dimethylformamide is added.

(B) PREPARATION OF POLYMER SOLUTION

To a vigorously stirred solution of 7.9 g. (0.055 mole) of methyliminobispropylamine in 4,000 ml. of dimethylformamide there is added 120 g. of prepolymer, followed by 29.4 g. (0.490 mole) of ethylenediamine, 1.0 g. (0.01 mole) of diethanolamine and 2,000 ml. of dimethylformamide. Prepolymer is then added until the resulting polymer solution has a viscosity of 60–80 cps. A 50% dispersion of titanium dioxide in dimethylformamide is added to the polymer solution. The polymer solution contains about 18% of polymer.

Example 1

To 1,000 g. of the above polymer solution there is added 1.0% of Antioxidant A and 1.4% of Stabilizer A, each based on polymer solids.

The polymer solution is forced at constant speed by means of a precision gear pump through a spinnerette immersed in water, the spinnerette having 20 holes of 0.010″ diameter. The extruded semiplastic monofilaments are brought together to form a single coalesced multifilament fiber which is passed through a series of baths to extract the dimethylformamide by countercurrent washing with water. The wet fiber is then continuously dried and cured on a belt dryer and finally wound on spools. The resulting fiber is of approximately 420 denier.

Skeins of fiber were tested for discoloration by atmospheric fumes and by ultraviolet radiation. The color index after 32 hours of exposure to fumes is about 3.5. The color index after 80 hours' exposure to ultraviolet radiation is about 4.0, indicating very good color stability.

When the procedure of Example 1 is repeated with the Stabilizer A omitted, the color indices after exposure to fumes for 32 hours and to ultraviolet radiation for 80 hours each are about 2.5, indicating considerable loss of stability. When the procedure of Example 1 is repeated with substitution of 1.4% of tris(p-nonylphenyl)phosphite for Stabilizer A, the color indices after exposure to fumes for 32 hours and ultraviolet radiation for 80 hours were about 1.5 and 3.0, respectively, indicating instability to fumes although good stability to ultraviolet radiation.

Example 2

To 1,000 g. of the above polymer solution is added 0.7% of Antioxidant A and 1.0% of Stabilizer B, each based on polymer solids. The polymer solution is spun into fibers by the procedure of Example 1. The color index of skeins of fiber exposed to fumes for 32 hours is about 4.0, showing good color stability.

When the test is repeated using 1.4% of Antioxidant A instead of 0.7% and omitting Stabilizer B, the color index of the fibers was 3.0, representing considerable loss of color stability.

Example 3

Three modified polymer solutions are prepared by adding the amount of Antioxidant B and Stabilizer A shown in Table I below to 1,000 g. samples of the above polymer solution, the percentages being based on polymer solids.

TABLE I

| | Antioxidant B, percent | Stabilizer A, percent |
|---|---|---|
| a | 1.0 | 1.0 |
| b | 1.0 | 0.5 |
| c | 1.0 | 0.2 |

The modified polymer solutions are spun into fibers by the procedure of Example 1. The color indexes of skeins of fiber exposed to fumes for 32 hours and to ultraviolet radiation for 80 hours as shown in Table II.

TABLE II [1]

| | Color index fumes | Color index UV radiation |
|---|---|---|
| a | 35 | 45 |
| b | 30 | 45 |
| c | 30 | 40 |

[1] Color determination procedures of Examples 3 and 4 were the same as those for Examples 1 and 2 except that for change of the color scale from 5 to 1 to 50 to 0 where 50 represents a colorless standard swatch and 0 represents a deep yellow colored swatch. A 5 unit change in coloration is easily detected by the unaided eye. Color stabilization represented by color indices of 30 and higher is considered good.

Example 4

Substantially as described in Example 3, three modified polymer solutions are prepared by adding the amounts of Antioxidant A and Stabilizer A shown in Table III to 1,000 g. of the above polymer solution, the percentages being based on polymer solids.

TABLE III

| | Antioxidant A | Stabilizer A |
|---|---|---|
| a | 1.0 | 0 |
| b | 0.5 | 1.5 |
| c | 0 | 2.0 |

The modified polymer solutions are spun into fibers by the procedure of Example 1. The color indexes of skeins of fiber exposed to fumes for 32 hours and to ultraviolet radiation for 80 hours are shown in Table IV. Also shown is the percentage of the original ultimate tenacity retained after the exposure to ultraviolet radiation.

TABLE IV

| | Fume exposure color index | UV radiation color index | Exposure retention, percent |
|---|---|---|---|
| a | 25–30 | 30 | 52 |
| b | 43 | 40 | 72 |
| c | 45 | 25 | 39 |

This example shows that the combination of additives gives the best fiber properties, and that neither additive alone, even in increased amount, is equal to the combination.

We claim:
1. A polyurethane elastomer stabilized with
(a) a substituted phenol having the formula

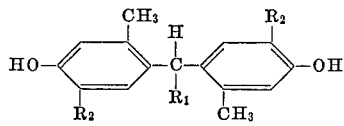

wherein $R_1$ is hydrogen or alkyl of from 1 to 8 carbon atoms and $R_2$ is alkyl of from 4 to 8 carbon atoms, and
(b) an organic phosphite selected from the group consisting of (i)

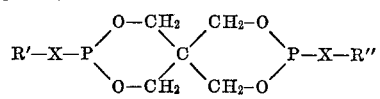

and (ii)

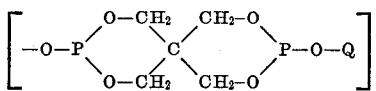

wherein R′ and R″ are alkyl of from 6 to 18 carbon atoms; X is oxygen or sulfur; Q is the hydrogenated residue of 2,2'-bis (4-hydroxyphenyl) propane and the molecular weight of (ii) is at least 1,000.

wherein said polyurethane elastomer is prepared by reacting a molar excess of an organic diisocyanate with a polyalkylene ether glycol or hydroxy-terminated polyester, or a mixture of said glycol and said polyester, to form an isocyanate terminated prepolymer, and then reacting said prepolymer with a chain-extending compound.

2. The elastomer of claim 1, wherein the organic phosphite is that of Formula (i).

3. The elastomer of claim 1, wherein the organic phosphate is that of Formula (ii).

4. The elastomer of claim 1, wherein the substituted phenol is 4,4'-butylidene bis (6-tert-butyl-m-cresol) and the organic phosphite is:

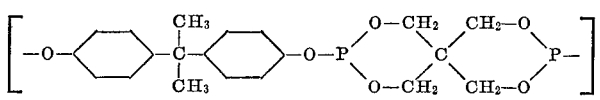

having a molecular weight of 2,500 to 3,000.

5. The elastomer of claim 1, wherein the substituted phenol is 4,4'-butylidene bis (6-tert-butyl-m-cresol) and the organic phosphite is:

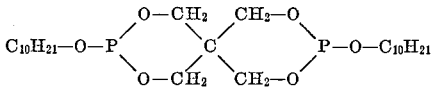

References Cited

UNITED STATES PATENTS

| | | | |
|---|---|---|---|
| 3,047,608 | 7/1962 | Friedman et al. | 260—45.7 |
| 3,053,878 | 9/1962 | Friedman et al. | 260—461 |
| 3,285,855 | 11/1966 | Dexter | 260—45.85 |
| 3,352,822 | 11/1967 | Yamadera et al. | 260—45.85 |
| 3,429,837 | 2/1969 | Langrish et al. | 260—45.95 |
| 3,445,423 | 5/1969 | Sunshine et al. | 260—45.85 |
| 3,395,114 | 7/1968 | Smith et al. | 260—45.95 |

DONALD E. CZAJA, Primary Examiner

V. P. HOKE, Assistant Examiner

U.S. Cl. X.R.

260—2.5, 45.7, 45.85, 45.95